Nov. 25, 1969    P. HIMMELSBACH    3,480,349
MECHANISM FOR DIFFERENTLY DISPLACING TWO MOVABLE
COMPONENTS IN AN OPTICAL OBJECTIVE
Filed May 24, 1967

Paul Himmelsbach
Inventor.

By
Karl F. Ross
Attorney

United States Patent Office 3,480,349
Patented Nov. 25, 1969

3,480,349
MECHANISM FOR DIFFERENTLY DISPLACING TWO MOVABLE COMPONENTS IN AN OPTICAL OBJECTIVE
Paul Himmelsbach, Bad Kreuznach, Germany, assignor to Jos. Schneider & Co., Bad Kreuznach, Germany, a corporation of Germany
Filed May 24, 1967, Ser. No. 640,862
Claims priority, application Germany, June 2, 1966, Sch 39,060
Int. Cl. G02b 15/14
U.S. Cl. 350—187　　　　　　　　　　　4 Claims

ABSTRACT OF THE DISCLOSURE

Optical objective having two components displaceable along an optical axis with relative differential motion designed to provide a predetermined optical effect, one of these components being freely movable and being coupled with the other component by an elastic linkage biased in one axial direction; a counter-vailing force is created by a cam follower which coacts with a stationary cam and is movably mounted on one component while bearing upon the other component at a point whose distance from the first component varies in different axial positions of that first component.

---

My present invention relates to an optical objective, e.g. as used in photographic, cinematographic or television cameras, in which two components are axially displaceable at different rates for purposes of focusing or, as is the more usual case, to vary the overall focal length of the objective while keeping its image plane fixed. Such varifocal objective systems are disclosed, for example, in my prior U.S. Patent No. 3,165,044 and in commonly owned U.S. Patent No. 3,095,750 to Herbert Mahn.

In these prior systems, the differential displacement of the two concurrently movable components is brought about by separate camming formations, such as slots or grovoes, in a rotatable control member. These camming formations must be machined very accurately in order to insure the correct spacing of the components of the objective in every operating position. Because such machining is time-consuming and expensive, my present invention has for its principal object the provision of an improved control mechanism requiring only one curve for the guidance of two differentially movable optical components.

Another object of my invention is the reduction of frictional forces in such a control mechanism to enable the adjustment of the focal length or other parameter with less effort than heretofore, allowing for direct (e.g. manual) displacement of one of the controlled components in lieu of the hitherto necessary indirect drive thereof through rotation of a common control member.

These objects are realized, pursuant to my present invention, by mounting one of the two displaceable components for free axial movement and coupling this first component with the second movable component through a linkage which is mounted on the first component and engages the second component at a point whose distance from the first component varies under the control of a cam follower engaging a generally axially extending single cam. Thus, as the first component is shifted into different axial positions, the cam follower varies the effective length of the linkage and, thereby, alters the separation of the two movable components in conformity with their predetermined law of relative displacement.

Advantageously, the adjustable linkage comprises a swingable member, such as a bell-crank lever or its equivalent, which has one portion rigid with the cam follower and acts with another portion on the second movable component in a direction opposing the force of a biasing spring. In a particularly simple arrangement the biasing spring is of the contractile type, tending to move the components toward each other, while the bell-crank lever bears upon the second component to urge it away from the first component.

According to another feature of my invention, the cam may be in the form of a bar of varying cross-section whose surface represents a figure of revolution; such a bar can be easily turned on a lathe. Because of the central symmetry of a bar of this type, its angular orientation is not critical and it may be simply suspended at its ends with freedom of rotation about its own axis.

The invention will be described in greater detail with reference to the accompanying drawing in which.

Figure 1:
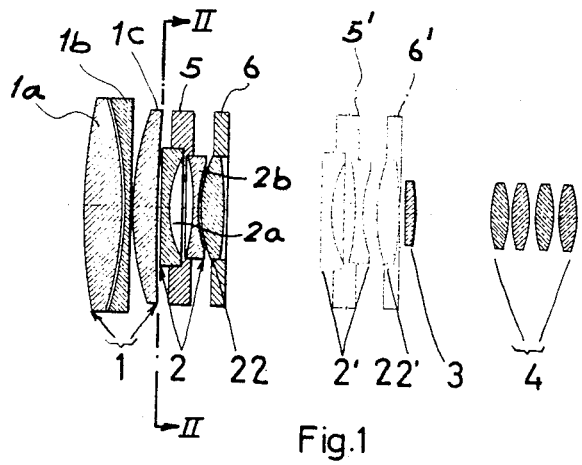
FIG. 1 is a somewhat diagrammatic view of a varifocal optical objective with two axially movale components.

In FIG. 1 I have shown a conventional varifocal objective with a positive front component 1, a first axially movable component 2 of negative refractivity, a second axially movable component 22 of positive refractivity and another fixed component 3, also positive, these components together constituting a varifocal attachment for a fixed basic objective 4 which need not be described in detail. Component 1 is shown to include three lenses 1a, 1b and 1c; front lens 1a may be limitedly axially displaceable for focusing purposes. Component 2 is constituted by two closely juxtaposed lenses 2a and 2b. Components 22 and 3 are shown as singlets.

A cylindrical objective housing 17 (FIGS. 2 and 3) supports the stationary components 1 and 3 and is provided with three fixed guide rods 8, 9 and 10 extending close to its inner periphery in a direction parallel to the optical axis O. A first mounting ring 5, supporting the component 2, is slidably guided on rods 8 and 10; a second mounting ring 6, supporting the component 22, is similarly guided on rods 9 and 10. Rod 8 passes through a boss 18 on ring 5 fitting into a peripheral clearance of ring 6; conversely, rod 9 traverses a sleeve 19 which is rigid with ring 6 and fits into a peripheral cutout of ring 5.

An elongated cam 15, in the shape of a centrally symmetrical bar of varying cross-section, is mounted in housing 17 by its preferably retractable gudgeons 17a, 17b so as to be freely rotatable about its own axis which is also parallel to optical axis O; this mode of mounting facilitates removal of cam bar 15 for purposes of inspection or replacement. A bellcrank lever 11, pivotally mounted on boss 18 by means of a pin 12, has an end 13 contacting the cam 15 to act as a cam follower; the opposite end 14 of lever 11 bears a study 16 pivotally received in a groove 19a of sleeve 19. A tension spring 7 is anchored to rings 5 and 6, urging these rings toward each other and maintaining the lever end 113 is engagement with cam bar 15. Pin 12 projects outwardly through an axially extending slot 20 in housing 17 to enable a shifting of ring 5 along the axis O so as to displace the component 2 between one limiting position, shown in full lines in FIG. 1, to its other limiting position indicated at 2′ in FIG. 1 and shown in dot-dash lines. The corresponding alternate position of component 22 has also been shown in dot-dash lines and has been designated 22′ in FIG. 1.

Figures 2, 3:
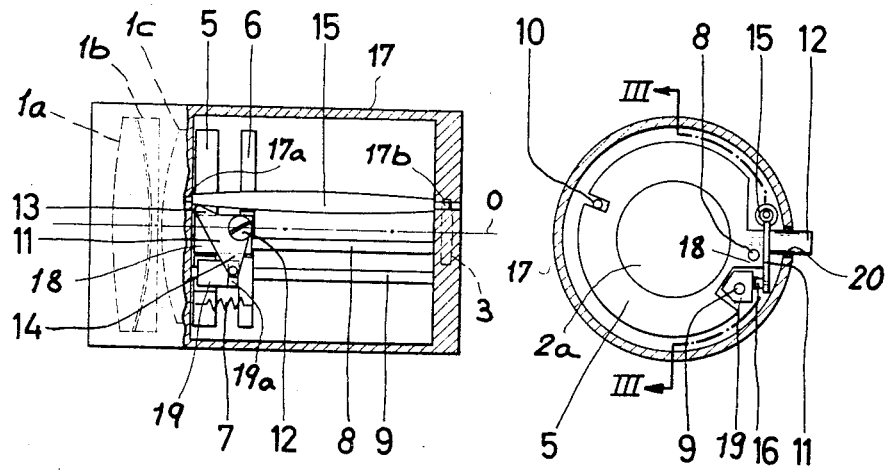
FIG. 2 is a cross-ectional view of the objective and its housing (not shown in FIG. 1) taken on the line II—II of FIG. 1.
FIG. 3 is a side-elevational view taken partly in section on the line III—III of FIG. 2.

During the shifting of component 2 from, say, left to right as viewed in FIGS. 1 and 3, component 22 moves generally in the same direction but at different rates (with possible reversals of motion inbetween) as determined by the shape of cam 15 which causes the lever 11 to swing first counterclockwise and then clockwise, thereby first increasing and then reducing the spacing between the two movable components. This relative motion of component 22 is designed, as is well understood in the art, to compensate for changes in the back-focal length of the objective which would otherwise result from the displacement of component 2 to vary the overall focal length. It will be noted that the controlling lever arm 12–13 of link 11 is generally parallel to axis O whereas the controlled lever arm 12–14 is generally transverse to the axial direction; as a result of this relationship, any radial increment of cam 15 is translated into a substantially identical change in the mutual separation of lens mounts 5 and 6 during axial entrainment of one lens mount by the other.

The axial displacement of pin 12 can be readily performed by hand against little frictional resistance; in this instance a scale may be provided on the objective housing to indicate the focal length of the objective in any position of that pin. It is, however, also possible to use an automatic drive for this displacement, e.g. in the form of a reversible motor as disclosed in my above-identified prior patent.

I claim:
1. An optical objective comprising a first and a second mount for optical components displaceable along a common optical axis; axially extending guide means for said mounts; an elongate cam member extending generally parallel to said axis at a fixed location; lever means fulcrumed on said first mount, said lever means having a controlling arm and a controlled arm disposed substantially at right angles to each other and interconnected for joint movement, said controlling arm lying generally parallel to said axis and having a free end provided with cam-follower means in contact with said cam member, said second mount being provided with an extension pivotally coupled with a free end of said controlled arm; and resilient means tending to draw said components toward each other.

2. The combination defined in claim 1 wherein said resilient means is a contractile spring anchored to both said components.

3. The combination defined in claim 1 wherein said cam member comprises a bar of varying cross-section.

4. The combination defined in claim 3 wherein said bar has a surface in the form of a figure of revolution with curvilinear generatrices, said bar being mounted with freedom of rotation about its own axis.

References Cited

UNITED STATES PATENTS

| 2,305,160 | 12/1942 | Hansen | 95—45 X |
| 2,532,685 | 12/1950 | Walker | 350—187 X |
| 2,547,187 | 4/1951 | Walker | 350—187 |
| 2,906,185 | 9/1959 | Naumann et al. | 95—45 X |

DAVID SCHONBERG, Primary Examiner

PAUL R. GILLIAM, Assistant Examiner

U.S. Cl. X.R.
350—44, 255